Patented Sept. 1, 1931

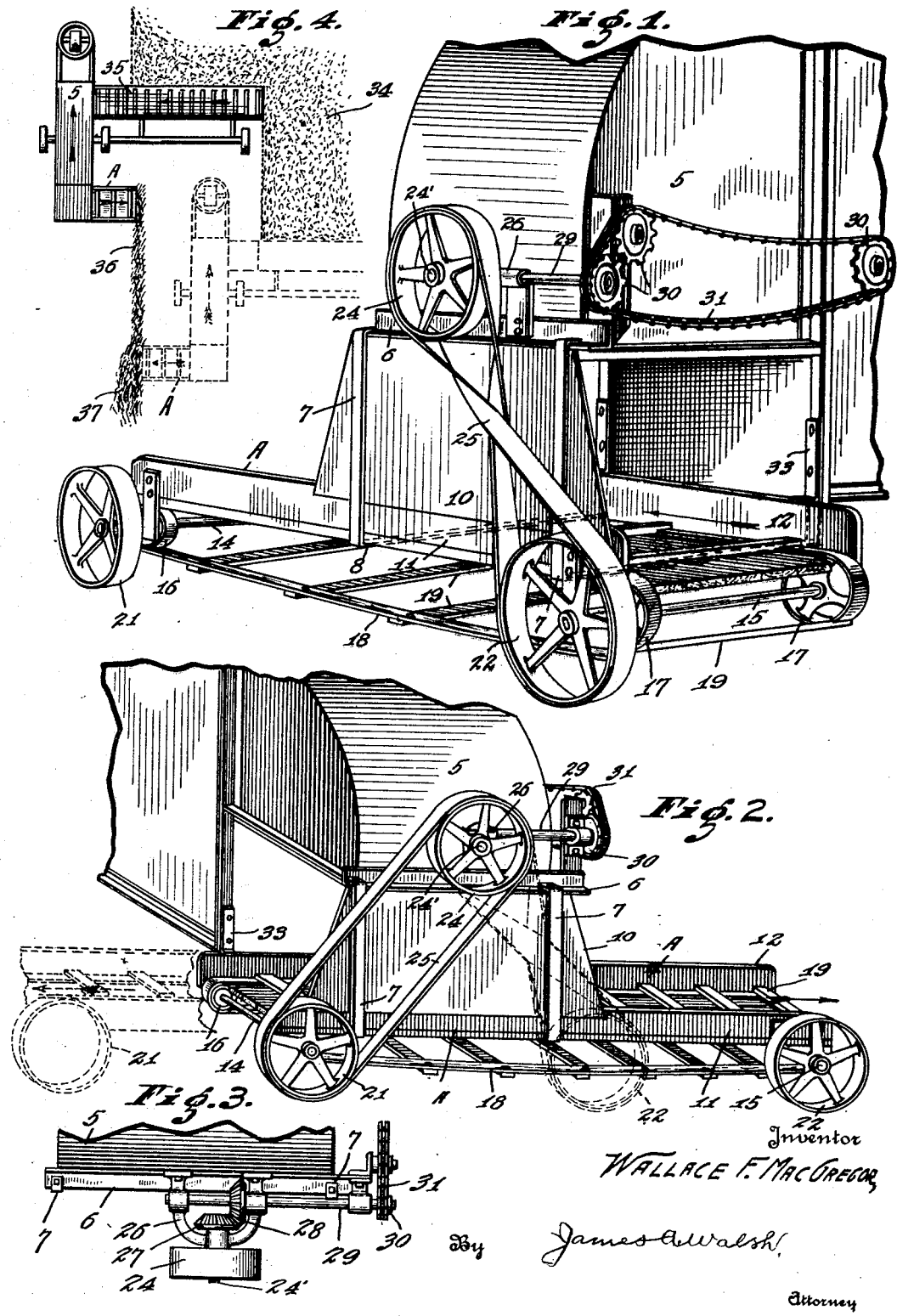

1,821,065

UNITED STATES PATENT OFFICE

WALLACE F. MacGREGOR, OF RACINE, WISCONSIN, ASSIGNOR TO J. I. CASE COMPANY, OF RACINE, WISCONSIN, A CORPORATION

COMBINATION HARVESTER-THRASHER

Application filed February 3, 1930. Serial No. 425,381.

In the operation of a combination harvester-thrasher it is the practice to employ a straw spreader at the discharge end of the thrasher element for scattering the thrashed straw upon the ground as the machine moves through the field, which straw if desired to be utilized as fertilizer is plowed under. When it is desired to save the straw for fodder, bedding and other purposes it is customary to employ wagons to be loaded, a hay loader for picking up from a single row, or a bunching attachment may be used on the combine for arranging the scattered straw in piles throughout the field and then collected, requiring considerable labor and time, as such piled straw must be loaded into wagons or otherwise disposed of.

My present invention relates to improved means for handling straw as it is being discharged from the rear of a combine whereby I am enabled to superpose one windrow upon another in such manner that when the combine has made two rounds of a field the straw discharged therefrom during the second round will be deposited upon that discharged on the first round, so that a single windrow is formed of such volume as to be more effectively handled than the usual windrow of a light and sparsely constructed character. By thus constructing the windrow it will be apparent that in employing a wagon or other equipment to collect the straw only half the traveling distance is required to obtain a load, with the further advantage that a heavily built windrow can be more readily forked or picked up with a hay loader in a much cleaner manner without appreciable waste, as will hereinafter more fully appear.

In the accompanying drawings, forming part hereof, Figure 1 is a perspective of the rear of a combine equipped with my improved carrier so adjusted as to discharge the straw to the left side of the machine; Fig. 2, a similar view showing the carrier in position to discharge straw to the right side of the machine; Fig. 3, a detail plan view of driving mechanism which I may employ; and Fig. 4 is a diagrammatic view showing the combine in full lines as it is forming a windrow during its first round, and in dotted lines as it is depositing a windrow during its second round upon the windrow initially formed.

In said drawings the numeral 5 indicates the rear end of a combine, which may be of any desired construction, and upon which my improved straw carrier A is mounted by means of a transversely arranged angle-iron 6 or otherwise to which the carrier supports 7 are secured, the latter being provided with horizontal members 8 secured to the combine in any suitable manner. To the supports 7 a shield or deflector 10 is secured for preventing straw from discharging at the rear and deflecting the same onto the carrier, which comprises a frame embodying sideboards 11, 12, in which transverse shafts 14, 15, are mounted and carry pulleys 16, 16, and 17, 17, about which a conveyer is mounted composed of belts and slots 18, 19, respectively, and which conveyer travels about said pulleys in a well known manner. Upon shafts 14, 15, I mount pulleys 21, 22, for actuating the carrier, and which pulleys and the main drive pulley 24 are connected by a belt 25, the drive pulley 24 being mounted in a bracket 26 secured to the angle-iron 6. Said drive pulley preferably embodies a shaft 24' provided with a gear 27 which engages and is driven by gear 28 on shaft 29, the latter being rotated by a sprocket-and-chain system 30, 31, actuated from a source of power on the machine.

In the operation of my improved carrier, when it is desired to deliver straw at the right side of the machine the carrier, being held by guides 33 on the rear end of the machine and also on the inner side of the supports 7 (not shown), is projected outwardly to the position indicated by the full line arrow in Fig. 2, and which position is also indicated in Fig. 4, the carrier being thus adjusted to discharge material at approximately one-half of the width of the swath cut, or other distance as required. When so arranged the combine is drawn through the crop 34, cutting a swath therethrough as indicated in Fig. 4, the cut grain being carried by the conveyer 35 into the thrasher 5 and the thrashed straw passing through the thrasher and discharging onto the carrier A which conveys it laterally from the machine and deposits it upon the ground in windrow formation, as 36. The machine traverses the outer portion of the crop and is turned at the corners until it has made the circuit of the field and reaches the position indicated by dotted lines in Fig. 4, whereupon the belt 25 is removed from pulley 21, the carrier projected to the left side of the machine approximately one-half of the width of the swath cut, and the belt 25 then crossed as indicated in Fig. 1 and placed about pulley 22. As the drive pulley 24 is mounted slightly off center on the machine, which position and that of pulley 22 compensates for the difference in length of the belt when crossed, its tension maintains the carrier in correct position without the requirement of other means. As is apparent from Fig. 4, the machine, indicated in dotted lines, is now in position to make the next round of cutting and thrashing, and during its movement the straw is delivered to the left and deposited upon the initial windrow 36, the two combined deposits thus forming a windrow of twice the volume, as 37, and which, as hereinbefore explained, is much more readily and economically removed by wagons or other pick-up equipment. It will therefore be understood that I provide an inexpensive, simply operated and efficient carrier for discharging straw in the manner described, and which by slight effort may be shifted to either side of the machine as desired and discharge the straw on the second round upon that previously deposited, so that it is but necessary to leave one large and comparatively dense windrow on the field every time the machine makes two rounds, instead of depositing two thinly built windrows as is common, and thus in providing a heavily built windrow it has the advantage of being subjected to less disruption and damage than a light windrow as commonly formed. It will be further understood that as the machine is open at its rear sides a canvas or other protector may be placed thereover to prevent interference with the proper operation of the carrier when windy weather prevails.

I claim as my invention:

1. A straw carrier for harvesters, comprising a frame, an endless conveyer mounted on the frame, a pulley at one end of the frame, a drive pulley, a belt connecting the drive pulley to said frame pulley for actuating the conveyer when the carrier is projected to one side of the harvester, a pulley at the opposite end of the frame to which said belt is transferred for actuating the conveyer in a reverse direction when the carrier is projected from the opposite side of the harvester, and means for actuating the drive pulley to propel said conveyer.

2. The combination, with a harvester, of a straw carrier comprising a shifting frame, a guideway for the frame, an endless conveyer mounted on the frame, means positioned rearwardly of the frame for deflecting material to the conveyer, means for actuating the conveyer to deposit straw at a predetermined distance from the harvester when the frame has been projected laterally, and means for reversing the movement of the conveyer to discharge straw at a predetermined distance from the opposite side of the harvester when the frame has been projected accordingly.

3. In a machine of the class described, a harvester, a thrasher, a conveyer mounted upon the discharge end of the thrasher in transverse relation thereto to be projected outwardly from either side of the thrasher, and means for actuating the conveyer to discharge material in windrows.

4. In a machine of the class described, a harvester, a thrasher, a conveyer slidably mounted upon the rear end of the thrasher and adapted to be projected laterally therefrom to discharge straw in windrow formation and also to be projected in an opposite direction to discharge and superpose a second windrow upon the first mentioned windrow, and means operable by the thrasher and connected to the conveyer for actuating the latter to discharge straw.

5. In a machine of the class described, a harvester, a thrasher having a straw discharge opening, a conveyer positioned transversely of the opening to receive straw discharging therethrough, means for deflecting the straw onto the conveyer, means for actuating the conveyer to discharge straw a predetermined distance from one side of the thrasher as the machine traverses a field, and means for reversing the movement of the conveyer to discharge straw a predetermined distance from the opposite side of the thrasher and deposit the same upon that previously deposited in windrows.

6. In a machine of the class described, a harvester, a thrasher having a straw discharge opening in its rear end, a conveyer in alignment with said opening for receiving straw discharging therethrough, means on the thrasher for supporting the conveyer whereby the latter may be projected laterally from either side of the thrasher, means for actuating said conveyer, and means on the thrasher connected to said actuating means for operating the latter.

7. In a machine of the class described, a harvester, a thrasher, a straw carrier on the thrasher having side walls and a conveyer traveling between the walls said conveyer being adapted to be projected from either side of the thrasher, a deflector for directing material to the conveyer, a pulley at opposite ends of the conveyer, a driving pulley on the thrasher, means for driving said latter pulley, and a belt connecting the driving pulley and one of said carrier pulleys for actuating the conveyer pulley said belt being transferable to the opposite conveyer pulley for actuating the latter, whereby said conveyer may be driven in opposite directions.

In testimony whereof I affix my signature.

WALLACE F. MacGREGOR.